United States Patent
Tong et al.

(10) Patent No.: US 10,317,522 B2
(45) Date of Patent: Jun. 11, 2019

(54) DETECTING LONG OBJECTS BY SENSOR FUSION

(71) Applicant: GM GLOBAL TECHNOLOGY OPERATIONS LLC, Detroit, MI (US)

(72) Inventors: Wei Tong, Troy, MI (US); Shuqing Zeng, Sterling Heights, MI (US); Jinsong Wang, Troy, MI (US); Wende Zhang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 610 days.

(21) Appl. No.: 15/057,437

(22) Filed: Mar. 1, 2016

(65) Prior Publication Data
US 2017/0254895 A1    Sep. 7, 2017

(51) Int. Cl.
| | | |
|---|---|---|
| *G01S 13/86* | (2006.01) |
| *G01S 7/41* | (2006.01) |
| *G01S 13/93* | (2006.01) |
| *G01S 13/89* | (2006.01) |
| *G01S 13/87* | (2006.01) |

(52) U.S. Cl.
CPC .............. *G01S 13/867* (2013.01); *G01S 7/41* (2013.01); *G01S 13/878* (2013.01); *G01S 13/89* (2013.01); *G01S 13/931* (2013.01); *G01S 2013/9357* (2013.01); *G01S 2013/9375* (2013.01); *G01S 2013/9378* (2013.01); *G01S 2013/9385* (2013.01)

(58) Field of Classification Search
CPC ...... G01S 13/86–13/878; G01S 13/931; G01S 7/41; G01S 13/89; G01S 2013/9385; G01S 2013/9378; G01S 2013/9375; G01S 2013/9357
See application file for complete search history.

(56) References Cited

U.S. PATENT DOCUMENTS

| | | | | |
|---|---|---|---|---|
| 5,963,653 A | * | 10/1999 | McNary ................. | G01S 7/417 342/109 |
| 6,414,712 B1 | * | 7/2002 | Wanielik ................ | G01C 21/28 348/118 |

(Continued)

OTHER PUBLICATIONS

C. Lundquist, U. Orguner and T. B. Schon, "Tracking stationary extended objects for road mapping using radar measurements," 2009 IEEE Intelligent Vehicles Symposium, Xi'an, 2009, pp. 405-410.doi: 10.1109/IVS.2009.5164312 (Year: 2009).*

*Primary Examiner* — Matthew M Barker
(74) *Attorney, Agent, or Firm* — Reising Ethington, P.C.

(57) ABSTRACT

A system and method are provided for detecting and identifying elongated objects relative to a host vehicle. The method includes detecting objects relative to the host vehicle using a plurality of object detection devices, identifying patterns in detection data that correspond to an elongated object, wherein the detection data includes data fused from at least two of the plurality of object detection devices, determining initial object parameter estimates for the elongated object using each of the plurality of object detection devices, calculating object parameter estimates for the elongated object by fusing the initial object parameter estimates from each of the plurality of object detection devices, and determining an object type classification for the elongated object by fusing the initial object parameter estimates from each of the plurality of object detection devices.

20 Claims, 6 Drawing Sheets

(56) References Cited

U.S. PATENT DOCUMENTS

| | | | | |
|---|---|---|---|---|
| 6,889,171 B2* | 5/2005 | Skrbina | G01S 13/931 | 701/301 |
| 8,125,372 B2* | 2/2012 | Focke | G01S 11/12 | 342/109 |
| 8,897,497 B2* | 11/2014 | Shiraishi | G01S 13/867 | 340/435 |
| 9,097,801 B2* | 8/2015 | Kambe | G01S 13/867 | |
| 9,224,053 B1* | 12/2015 | Ferguson | G06K 9/00798 | |
| 9,905,013 B2* | 2/2018 | Inomata | G06K 9/00805 | |
| 2008/0106462 A1* | 5/2008 | Shiraishi | G01S 11/12 | 342/146 |
| 2009/0201192 A1* | 8/2009 | Tokoro | B60R 21/0134 | 342/70 |
| 2009/0251355 A1* | 10/2009 | Nanami | G01S 13/931 | 342/27 |
| 2011/0187863 A1* | 8/2011 | Glander | G01S 13/931 | 348/148 |
| 2012/0106786 A1* | 5/2012 | Shiraishi | G01S 17/936 | 382/103 |
| 2014/0035777 A1* | 2/2014 | Kim | G01S 13/93 | 342/146 |
| 2014/0195138 A1* | 7/2014 | Stelzig | G08G 1/0116 | 701/119 |
| 2014/0297171 A1* | 10/2014 | Minemura | G08G 1/166 | 701/301 |
| 2014/0330479 A1* | 11/2014 | Dolgov | B60W 30/16 | 701/28 |
| 2015/0102955 A1* | 4/2015 | O'Dea | G01S 7/41 | 342/70 |
| 2016/0109566 A1* | 4/2016 | Liu | G01S 13/66 | 342/52 |
| 2016/0349358 A1* | 12/2016 | Noda | G01S 13/867 | |
| 2017/0206436 A1* | 7/2017 | Schiffmann | B60R 1/00 | |
| 2018/0149740 A1* | 5/2018 | Tamura | G01S 13/86 | |
| 2018/0312163 A1* | 11/2018 | Minemura | B60T 7/12 | |

\* cited by examiner

DETECTING LONG OBJECTS BY SENSOR FUSION

TECHNICAL FIELD

The present invention relates generally to object detection systems, and more particularly, to a system and method for general long object detection using sensor fusion.

BACKGROUND

Many modern vehicles are equipped with advanced safety and driver-assist systems that require robust and precise object detection and tracking systems to control responsive host vehicle maneuvers. These systems utilize periodic or continuous detection of objects and control algorithms to estimate various object parameters, such as the relative object range, range rate (i.e., closing or opening velocity of object), direction of travel, object position, and size of the object. The object detection systems may use any of a number of detection technologies, such as radar, vision imaging, laser, light detection and ranging (LiDAR), ultrasound, etc. Each of these detection systems contribute to object detection and to estimating object parameters in different ways, and with various limitations. Detecting generally long objects in particular can be challenging due to performance limitations associated with some detection systems.

For example, radar devices detect and locate objects by transmitting electromagnetic signals that reflect off objects within a sensor's field-of-view. The reflected signal returns to the radar as an echo where it is processed to determine various information such as the round-trip travel time of the transmitted/received energy. The round trip travel time is directly proportional to the range of the object from the radar. In addition to range determination, there are methods to determine azimuth (i.e. cross-range) location of detected objects. Therefore, depending on its complexity, radars are capable of locating objects in both range and azimuth relative to the device location.

Based on the reflected signals during a sampling of the entire sensor field-of-view, radar devices accumulate a set of detection points. Due to the nature of "reflections" collected by a remote sensor (whether a radar, laser, ultrasonic, or other active sensor), the set of detection points is representative of only certain spots on the object or objects present in the sensor's field-of-view. These detection points are analyzed in order to determine what type of objects may be present and where such object(s) are located. However, short-range radar devices lack the angular and spatial resolution necessary to discern object-identifying details and to distinguish between closely-located objects (i.e., no point target assumption). Performance degradation also arises in radar systems when there is little or no relative speed between the host and the object, making it difficult to estimate speed and direction. With respect to detecting long objects in particular, since the reflected measurement signals can vary significantly at different locations for the same object, radar devices are unable to directly group or cluster detection points effectively.

Vision imaging is also widely used by object detection and tracking systems to identify and classify objects located proximate to the host vehicle. In general, vision systems capture images with one or more camera(s), and extract objects and features from the images using various image processing techniques. The object is then tracked between the images as the object moves within the host vehicle's field-of-view. However, detecting long objects by vision is still very challenging especially when the object is too long and across the whole image frame for which the vision algorithms tend to split the long object into multiple short objects.

LiDAR sensors measure range using a time of flight principle. A light pulse is emitted for a defined length of time, reflected off a target object, and received via the same path (line-of-sight) along which it was sent. Because light travels with constant velocity, the time interval between emission and detection is proportional to a distance between the sensor to the point of reflection. However, it is difficult to estimate target speed using LiDAR because there is no direct speed measurement from the sensors.

SUMMARY

According to an embodiment of the invention, there is provided a method for detecting and identifying elongated objects relative to a host vehicle. The method includes detecting objects relative to the host vehicle using a plurality of object detection devices, identifying patterns in detection data that correspond to an elongated object, wherein the detection data includes data fused from at least two of the plurality of object detection devices, determining initial object parameter estimates for the elongated object using each of the plurality of object detection devices, calculating object parameter estimates for the elongated object by fusing the initial object parameter estimates from each of the plurality of object detection devices, and determining an object type classification for the elongated object by fusing the initial object parameter estimates from each of the plurality of object detection devices.

According to another embodiment of the invention, there is provided a method for detecting and identifying elongated objects relative to a host vehicle. The method includes obtaining detection data relating to objects detected using a plurality of object detection devices, fusing the detection data at a first processing level by referencing complementary detection data from each of the plurality of object detection devices, classifying a detected object as an elongated object at each of the plurality of object detection devices by identifying patterns in the fused detection data that correspond to an elongated object, calculating initial object parameter estimates for the elongated object using each of the plurality of object detection devices, and fusing the detection data at a second processing level by weighting the initial object parameter estimates for each of the plurality of object detection devices and summing the weighted initial object parameter estimates to determine object parameter estimates for the elongated object and calculating a maximum probability of a particular class of objects as a function of the initial object parameter estimates from each of the plurality of object detection devices to determine an object type classification for the elongated object.

According to yet another embodiment of the invention, there is provided a system for detecting and identifying elongated objects relative to a host vehicle. The system at least two object detection devices configured to obtain detection data relating to objects detected in a field-of-view relating to each of the at least two object detection devices, fuse the detection data by referencing complementary detection data from each of the at least two object detection devices, classify a detected object as an elongated object by identifying patterns in the fused detection data that correspond to an elongated object, and calculate initial object parameter estimates for the elongated object using each of the at least two object detection devices. The system further includes at least one vehicle control module configured to receive the initial object parameter estimates from each of the at least two object detection devices and fuse the detection data to determine object parameter estimates and to classify the type of elongated object.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE
ILLUSTRATED EMBODIMENT(S)

As required, detailed embodiments are disclosed herein. However, it is understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, components, systems, materials, or methods that are well-known to those having ordinary skill in the art have not been described in detail to avoid obscuring the present disclosure. Therefore, specific structural and functional details disclosed herein are not to be interpreted as limiting, but merely as a basis for the claims and as a representative basis for teaching one skilled in the art. Moreover, while the approach and methodology are described below with respect to vehicles, one of ordinary skill in the art appreciates that an automotive application is merely exemplary, and that the concepts disclosed herein may also be applied to any other suitable object detection system such as, for example, air traffic control, nautical navigation, and weapons guidance systems, to name a few. The term vehicle as described herein is also to be construed broadly to include not only a passenger car, but any other vehicle including, but not limited to, motorcycles, trucks, sports utility vehicles (SUVs), recreational vehicles (RVs), marine vessels, and aircraft.

Figure 1:
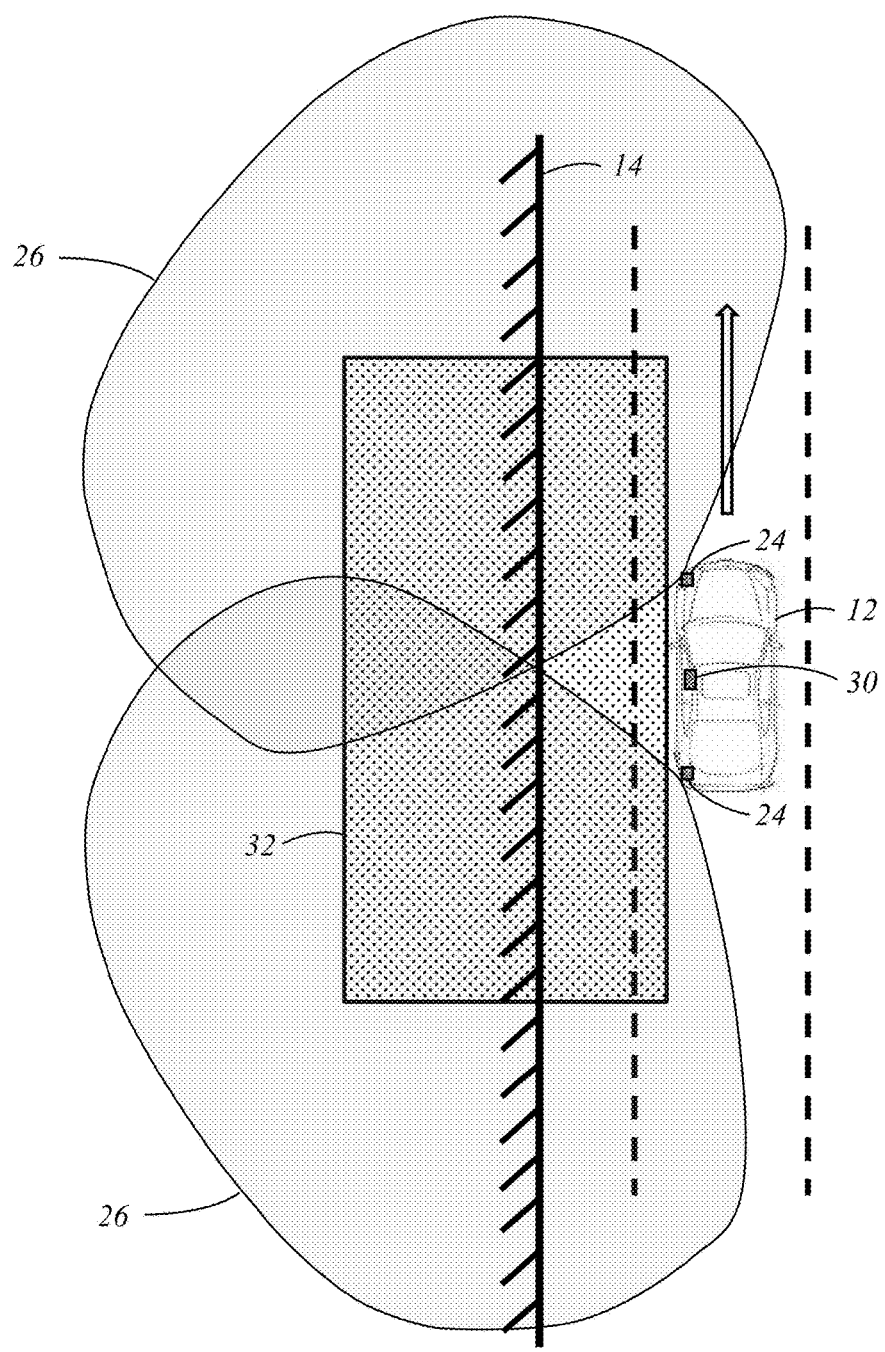
FIG. 1 illustrates an overview of an exemplary environment that includes a host vehicle and a long object according to an exemplary embodiment of the present disclosure.

Although the present disclosure and exemplary embodiments are primarily described, by way of example, with respect to vision and radar detection systems, the general concepts disclosed herein can be used to fuse output(s) from various types of sensors and object detection devices. In other words, any number of different sensors, components, devices, modules, systems, etc. may provide the disclosed object detection system with information or input that can be used by the present methods. It should be appreciated that object detection devices, as well as any other sensors located in and/or used by the disclosed object detection system may be embodied in hardware, software, firmware, or some combination thereof. These devices may be integrated within another vehicle component, device, module, system, etc. (e.g., sensors integrated within an engine control module (ECM), traction control system (TCS), electronic stability control (ESC) system, antilock brake system (ABS), etc.), or they may be stand-alone components (as schematically shown in FIG. 1). It is possible for any of the various sensor readings described below to be provided by some other component, device, module, system, etc. in the host vehicle instead of being directly provided by an actual sensor element. In some instances, multiple devices might be employed to sense a single parameter (e.g., for providing signal redundancy). It should be appreciated that the foregoing scenarios represent only some of the possibilities, as any type of suitable sensor arrangement may be used by the disclosed object detection system.

The system and method described below are directed to detecting long (i.e., elongated) objects by fusing object detection data at multiple levels using multiple object detection devices. In one embodiment, the system includes a dual-level fusion process wherein object detection data is fused at different process stages. More specifically, object detection data may be fused at an individual detection device level and at a system level. At the individual level, each object detection device is configured to estimate various object parameters relating to one or more detected objects. The estimation process includes identifying and isolating detection data consistent with characteristics and patterns relating to long objects. The estimation process further includes utilizing complementary data from other object detection devices. At the system level, a fusion module is configured to determine overall parameter estimations and to classify the detected object based on a combination of the object parameter estimates from the individual detection devices.

Figure 2:
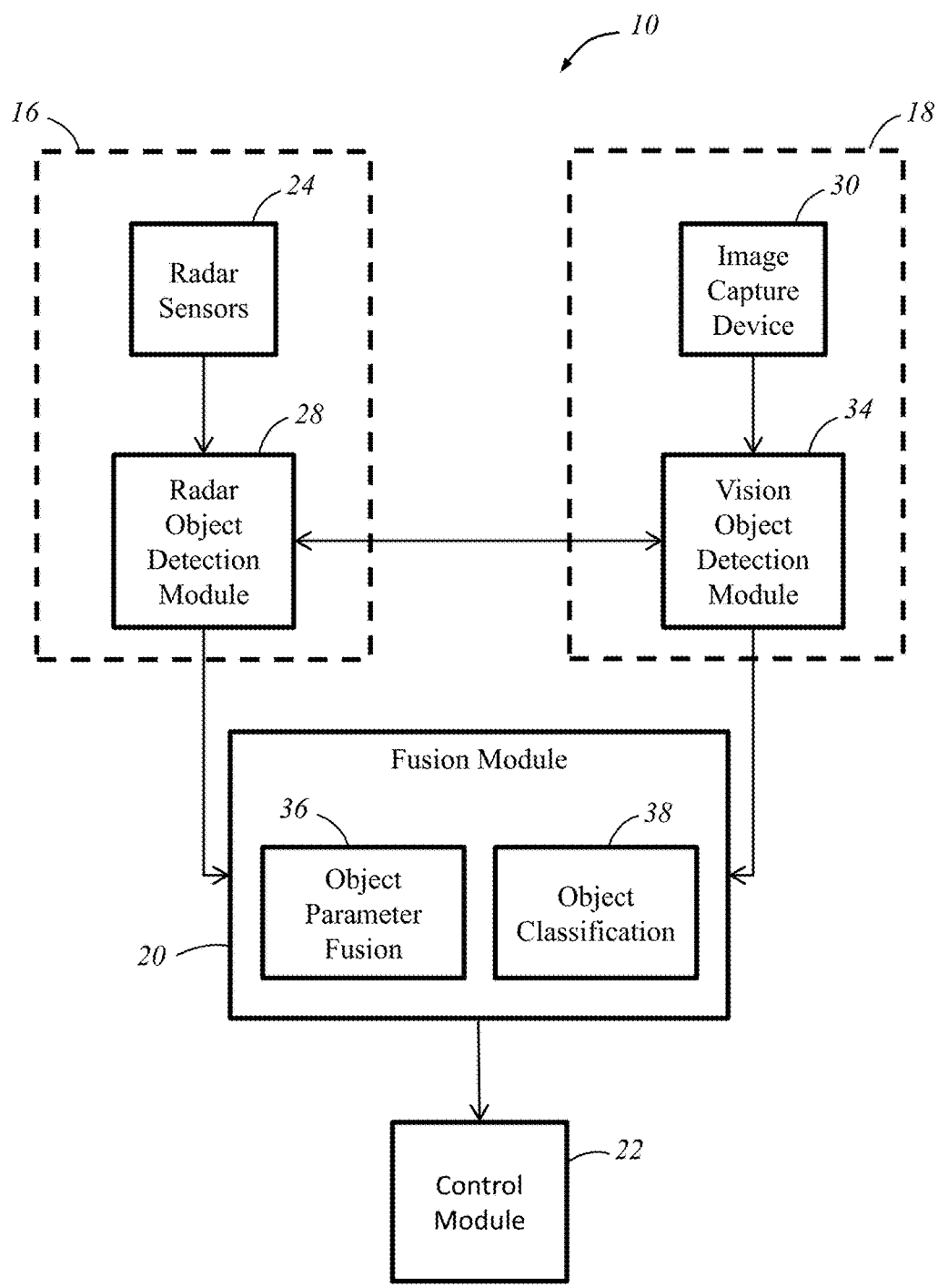
FIG. 2 illustrates a block diagram of an object detection and tracking system according to an exemplary embodiment of the present disclosure.

FIGS. 1 and 2 illustrate an object detection system 10 implemented by a host vehicle 12 according to an exemplary embodiment of the present disclosure. FIG. 1 illustrates an overview of an exemplary environment that includes the host vehicle 12 traveling alongside an elongated object 14, which in this non-limiting example is a guardrail, but may be any elongated object such as a wall, curb, long vehicle, etc. For ease of explanation, FIG. 1 shows only a zone of interest directed to one side of host vehicle 12 in connection with the long object 14. However, one of ordinary skill in the art appreciates that typical object detection and tracking systems are implemented on all sides of the host vehicle 12 in various combinations such that objects may be detected and tracked 360 degrees around the vehicle. FIG. 2 illustrates a block diagram of the object detection system 10 according to an exemplary embodiment.

With reference to FIGS. 1 and 2, the object detection system 10 includes a plurality of object detection devices 16, 18, a fusion module 20, and a vehicle control module 22. The plurality of objection detection devices 16, 18 are configured to detect objects in the environment surrounding the host vehicle 12 and may include known object detection systems including without limitation, a light detection and ranging (LiDAR) device, a radio detection and ranging (RADAR) device, a vision device (e.g., camera, etc.), a laser diode pointer, ultrasound, or combinations thereof. In the exemplary embodiment shown herein, the object detection devices in the host vehicle 12 refer to a radar detection device 16 and an imaging system 18, however, one of ordinary skill in the art appreciates that the plurality of object detection devices generally include two or more of any combination of suitable object detection devices.

The radar detection device 16 includes a plurality of radar sensors 24 positioned at various locations around the periphery of host vehicle 12. In the example shown in FIG. 1, radar sensors 24 are positioned in the front and rear left corners of the host vehicle 12, each creating a sensor field-of-view 26 that monitors a particular zone of interest. The radar sensors 24 are configured to transmit electromagnetic signals that reflect off remote objects within the radar sensor's field-of-view 26. The reflected signals return as an echo and are processed by a radar object detection module 28 that extracts information from the echo relating to the detected objects such as, for example, range, azimuth angle, and range rate data including Doppler measurements. The radar object detection module 28 may be a unitary module or may include a plurality of other modules, or sub-modules, configured to receive and process radar echo signals in accordance with the method and algorithms disclosed herein. In one embodiment, the radar object detection module 28 includes, without limitation, amplifiers, mixers, oscillators, combiners, filters, and converters. The functions performed by the radar object detection module 28 may vary, but generally include performing various filtering, amplification, conversion and digitizing functions, as well as analyzing various properties of the signal to determine characteristics of the signal such as phase, frequency, and amplitude. As understood by those skilled in the art, the techniques used to extract this information from the signals may vary, but may include without limitation, in-phase and quadrature analysis and frequency domain analysis using Fourier transform. In one embodiment, the radar object detection module 28 may also include, without limitation, components to perform pulse compression and clutter rejection (e.g., Doppler filtering) functions. As described in detail below, in accordance with the methods disclosed herein, the radar object detection module 28 is configured to estimate various parameters relating to a detected object using data from multiple object detection sensors. In one specific embodiment, the radar object detection module 28 is configured to detect a long object in the radar sensor's field-of-view 26 by identifying distinctive radar signal patterns typically associated with long objects. To identify the signal patterns, the radar object detection module 28 utilizes radar detection data and data received from at least one additional object detection source, such as imaging system 18.

The imaging system 18 includes at least one image capture device(s) 30 including, but not limited to, camera(s) that are mounted at various locations around the periphery of host vehicle 12. In the example shown in FIG. 1, an image capture device 30 is positioned along the left side of the host vehicle creating a field-of-view 32 that monitors a particular zone of interest, which in this example, is the left side of the host vehicle 12. The image capture device 30 captures images of objects in the field-of-view 32 and transmits the image data to a vision-based object detection module 34. In general, each captured image is a two-dimensional image of known pixel dimensions comprising a plurality of identifiable pixels. The plurality of identifiable pixels may be stored and analyzed using an array. Each pixel may be represented in the array as a set of bits or a plurality of sets of bits, wherein the bits correspond to a color on a predetermined palette or color map. Each pixel may be expressed as a function of a plurality of color intensity values such as in a red-green-blue (RGB) color model or a cyan-magenta-yellow-key (CMYK) color model. In one example, each pixel includes a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The vision-based object detection module 34 may be a unitary module or may include a plurality of other modules, or sub-modules, configured to receive and process the captured image in accordance with the method and algorithms disclosed herein. In one embodiment, processing the captured image includes extracting information relating to the detected objects and may include rectification, scaling, filtering and noise reduction of the captured image. As described in detail below, in accordance with the methods disclosed herein, the vision-based object detection module 34 is configured to estimate various parameters relating to a detected object using data from multiple object detection sensors. In one specific embodiment, the vision-based object detection module 34 is configured to identify regions of interest in objects detected in the system's field-of-view 32 using image frame data and data received from at least one additional object detection source, such as radar detection device 16.

The fusion module 20 is configured to receive and fuse object detection data from the plurality of object detection devices, which in the exemplary embodiment shown in FIGS. 1 and 2, includes the radar detection device 16 and the imaging system 18. One of ordinary skill in the art appreciates that the fusion module 20 may be a stand-alone module, or may be incorporated within another vehicle control module, such as, but not limited to, control module 22. The fusion module 20 may also include an electronic memory device that stores various data files, look up tables or other data structures, algorithms, etc.

The object detection data received by the fusion module 20 includes object parameter estimations, which in one embodiment, may include a kinematic model associated with each detected object. The kinematic model may vary, but generally includes kinematic parameters such as position, velocity, acceleration, direction of velocity, direction of acceleration, and other motion parameters. In one embodiment, the fusion module 20 includes an object parameter sub-module 36 and an object classification sub-module 38. One of ordinary skill in the art appreciates that the sub-modules 36, 38 may include independent processors or may utilize a single processor.

As set forth in detail below, the object parameter sub-module 36 and the object classification sub-module 38 are configured to receive object parameter estimation data from the radar detection device 16 and the imaging system 18, and to, respectively, estimate object parameters and classify the detected objects. In one embodiment, the object parameter sub-module 36 estimates object parameters such as, for example, location, speed, heading, and size of the detected object by weighting and combining parameter estimates received from the radar detection device 16 and the imaging system 18. Further, the classification sub-module 38 identifies the class of the detected object using a combination of the parameter estimates received from the radar detection device 16 and the imaging system 18. In one embodiment, the class of the detected object is determined using a probability function as described below.

Control module 22 is configured to receive the output of the fusion module 20, and in particular, the type of long object detected and the associated parameter data. The control module 22 may include any variety of electronic processing devices, memory devices, input/output (I/O) devices, and/or other known components, and may perform various control and/or communication related functions. Depending on the particular embodiment, control module 22 may be a stand-alone vehicle electronic module, it may be incorporated or included within another vehicle electronic module (e.g., a park assist control module, brake control module, etc.), or it may be part of a larger network or system (e.g., collision control module (CCM), a traction control system (TCS), electronic stability control (ESC) system, antilock brake system (ABS), driver assistance system, adaptive cruise control system, lane departure warning system, etc.), to name a few possibilities. Control module 22 is not limited to any one particular embodiment or arrangement.

Figure 3:
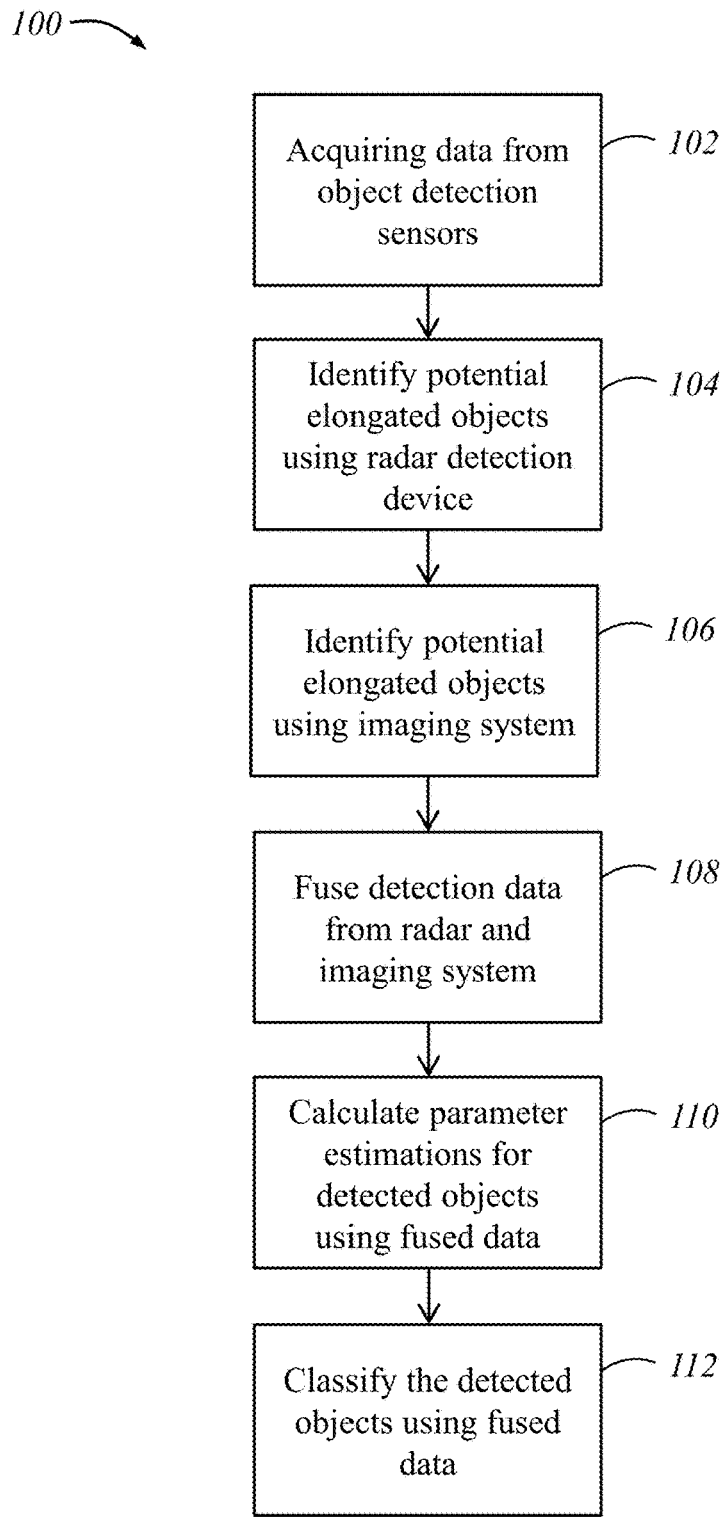
FIG. 3 illustrates a flow chart depicting an exemplary method for detecting a long object according to an exemplary embodiment of the present disclosure.

FIG. 3 illustrates a flow chart depicting an exemplary method 100 for detecting a long object using the object detection system 10 described above with respect to FIG. 2. It should be understood that the steps of the method 100 are not necessarily presented in any particular order and that performance of some or all the steps in an alternative order is possible and is contemplated. The method 100 begins at step 102 by acquiring one or more frames of data from a plurality of object detection sensors, which in one embodiment includes radar sensors 24 and image capturing device(s) 30. At step 104, potential long (elongated) objects are identified from the detection data obtained from the radar sensor 24.

Figure 4:
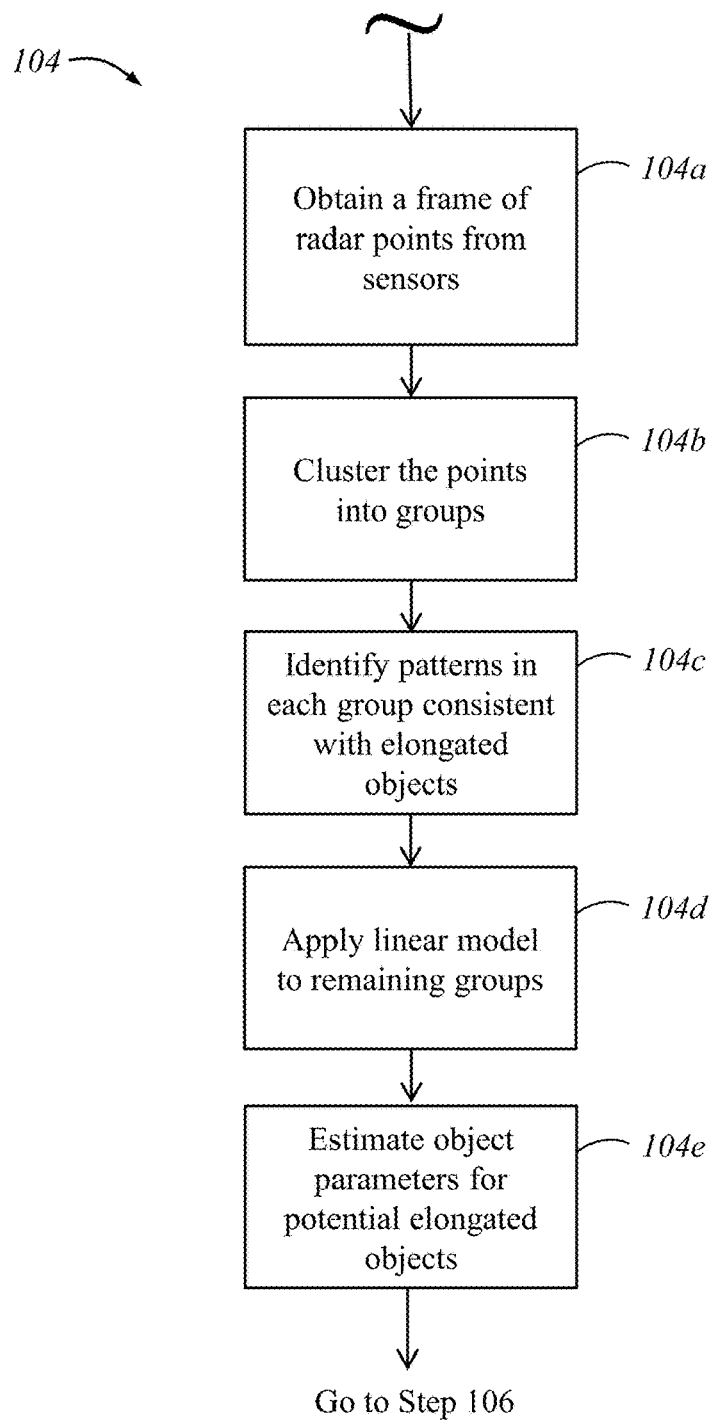
FIG. 4 illustrates a flow chart depicting an exemplary method for detecting a long object with a radar device according to an embodiment of the present disclosure.

In one embodiment of step 104, the radar object detection module 28 is configured to identify potential elongated objects according to the method illustrated in FIG. 4, wherein a frame of radar measurements (or points) $p_1$, $p_2$, ... $p_k$, for each $p_i$, is acquired at step 104a from radar sensors 24. The measurements may include, without limitation, range r, angle θ, Doppler v, and signal strength s. At step 104b, a clustering process is applied to each frame of radar measurements so that measurements from the same object are grouped together into one cluster. In one embodiment, the clustering process includes evaluating each point $p_i$ in the frame against a set of metrics, which may include, for example, the location and signal strength of each point $p_i$. The metrics may further include a fusion of information acquired from other object detection devices. For example, in one embodiment the location of each point $p_i$ is mapped to an image captured at the same time using imaging system 18. Information relating to the corresponding pixel in the captured image, such as an intensity value, can be used as an additional metric in the clustering process. Consequently, each of the points in the frame are clustered into groups $G_i=(p_{i1}, p_{i2}, ... p_{ij}))$ based on a fusion of object detection data from a plurality of object detection devices.

In one particular example, the collective object detection data may be clustered according to the k-means algorithm, which is based on the distance between each point $p_i$, or the distance between a point and a center of a potential cluster. For example, assume distance d between two points $p_i$ and $p_j$ is defined as:

$$d(p_i,p_j)=w_l d_l(p_i,p_j)+w_v d_v(p_i,p_j)$$

where $d_l(p_i, p_j)$ is the distance between the two points measured by their locations, $d_v(p_i, p_j)$ is the distance measured by visual similarity of corresponding patches in a captured image where the two points are projected onto the camera image plane, and $w_l$ and $w_v$ are weights to combine the distances from different sources wherein $w_l+w_v=1$. In one embodiment, the weights $w_1$ and are predefined based on the known heuristics or from statistics relating to the collected data. Alternatively, the weights $w_l$ and $w_v$ may also be calculated during operation based on the signal quality of the radar sensors and the vision sensors.

At step 104c, a pattern identification process is initiated to determine if a group of clustered points has a radar signal pattern consistent with that of a long object. In one exemplary embodiment, two primary factors are considered. The first is whether the points in a group $G_i$ are linearly distributed, and the second is whether there is a gradual speed progression between the points in each group $G_i$.

Figure 5:
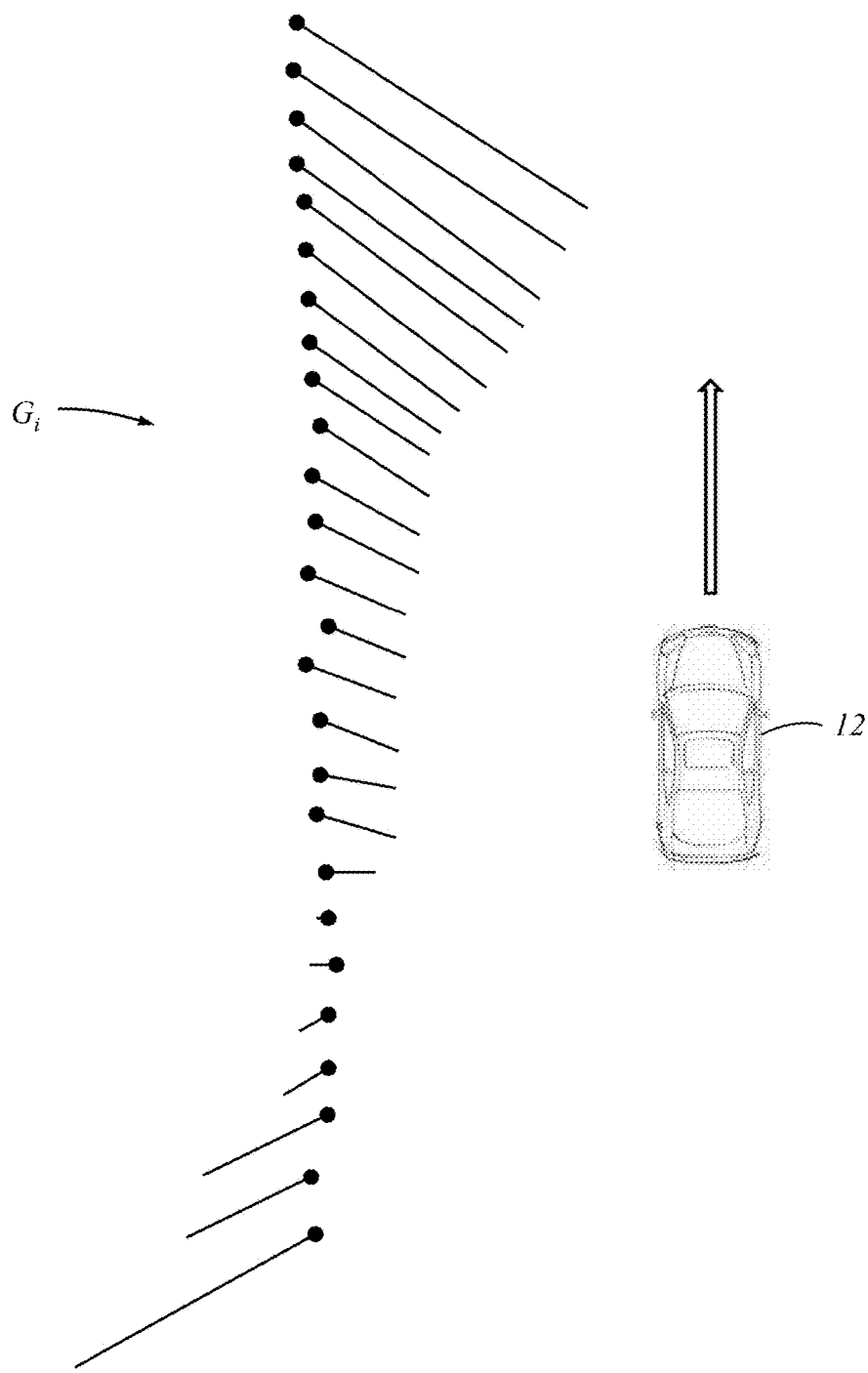
FIG. 5 illustrates a diagram of an exemplary plot of radar measurements associated with a long object according to an exemplary embodiment of the present disclosure.

The linear distribution of the data points in each group is determined by comparing the location between adjacent data points to determine if the points in each group are widely distributed in one dimension and are tightly concentrated in another perpendicular dimension. For example, FIG. 5 illustrates an example plot of radar measurements received from the guardrail shown in FIG. 1. Each radar data point $p_i$ represents a 3-D point in space (x, y, d), where x is a latitude coordinate relative to the host vehicle 12, y is a longitudinal coordinate relative to the host vehicle 12, and d is Doppler data that provides radial velocity information relative to the host vehicle 12. In this example, the data points in group $G_i$ are generally distributed along the y-axis (i.e., y-dimension) and the location of the points are highly concentrated along the perpendicular x-axis (i.e., x-dimension). In other words, there is a wide range of data point locations along the y-axis and a very small differential between the locations of each point along the x-axis. This group of points is therefore marked as a long object candidate. A group of points that does not meet the conditions set forth above for linear distribution is discarded as it is not likely that the group represents a long object.

The second factor, the speed progression between the points in each remaining group $G_i$, is examined by sorting, in an ascending or descending order, the points in each group according to the azimuth angle of each point relative to the host vehicle 12. As shown in FIG. 5, the radial velocity information from the Doppler data can be represented by speed vectors that indicate the direction and velocity of each point relative to the host vehicle 12. For each of the sorted points, a range rate is calculated according to known techniques to determine if there is a gradual change in the range rate for a majority of the sorted points, wherein in one embodiment the majority is determined based on a range rate threshold. The sorted points are also examined to determine if the range measurements associated with each point change in a gradual manner according to a range threshold. In one embodiment, the "gradual" change in the range rate and range measurements are based on a monotonic function, which as understood by those skilled in the art includes considering whether the values increase monotonically or decrease monotonically, whether the values increase monotonically and then decrease monotonically, or whether the numbers decrease monotonically and then increase monotonically. If a group of points is capable of being sorted in an ascending or descending order, and the range rate and range of the points in the group change gradually, then the group is marked as a long object candidate (i.e., a potential elongated object). A group of points that does not meet the sorting conditions set forth above is discarded as it is not likely that the group represents a long object.

At step 104d, for each long object candidate $O_i=(p_i^1, p_i^2, \ldots, p_i^k)$ with k radar points identified in step 104c, a linear regression model is applied. In one non-limiting example, the following linear model is applied to the data points for each long object candidate:

$$y_j = ax_j + b + \in_j, j=1, \ldots, k$$

where $(x_j, y_j)$ is the location of a radar point $p_j$ in the radar coordinate system, a and b are the scalar parameters of the linear model, which can be estimated using known techniques for fitting data points in a linear model (e.g., standard linear regression algorithms), and $\in_j$ is an error term (e.g., $\in_{radar}$), which as described in detail below is used by the fusion module 20 to fuse the object detection data.

Using the linear model, at step 104e parameters ($\theta_{radar}$) are estimated for each long object candidate $O_i$. In one embodiment, the parameter estimations include, but are not limited to, the elongated object's center of mass location, size (i.e., length), moving speed, and moving direction (i.e., heading).

Referring again to FIG. 3, at step 106 potential long (elongated) objects are identified from the detection data obtained from the image capture device 30. In one embodiment of step 106, the vision-based object detection module 34 is configured to identify potential elongated objects according to the method illustrated in FIG. 6, wherein a frame of data is obtained at step 106a including an image frame from the image capture device 30 at time t. At step 106b, the group of radar points for each long object candidate $O_i$ identified in step 104c is projected onto the image frame. At step 106c, for each group of the projected radar points on the image, a patch of the image that covers the projected points is generated. Each image patch I then represents a potential elongated object in the image. At step 106d, points of interest (e.g., corners, points on a guardrail, etc.) are identified for each of the image patches generated in step 106c for a current frame at time t. Structured lighting can be used for objects without good textures. At step 106e, the points of interest for the current frame t are matched to those same points of interest in a previous image frame at time t-1. In this way, the movement of the detected object(s) can be monitored based on an optical flow approach. At step 106f, object parameter estimations ($\theta_{vision}$) and error values (e.g., $\in_{vision}$) are calculated using the identified regions of interest according to known computer vision techniques. In one embodiment, the parameter estimations include, but are not limited to, the elongated object's location, size (i.e., length), moving speed, and moving direction (i.e., heading).

Figure 6:
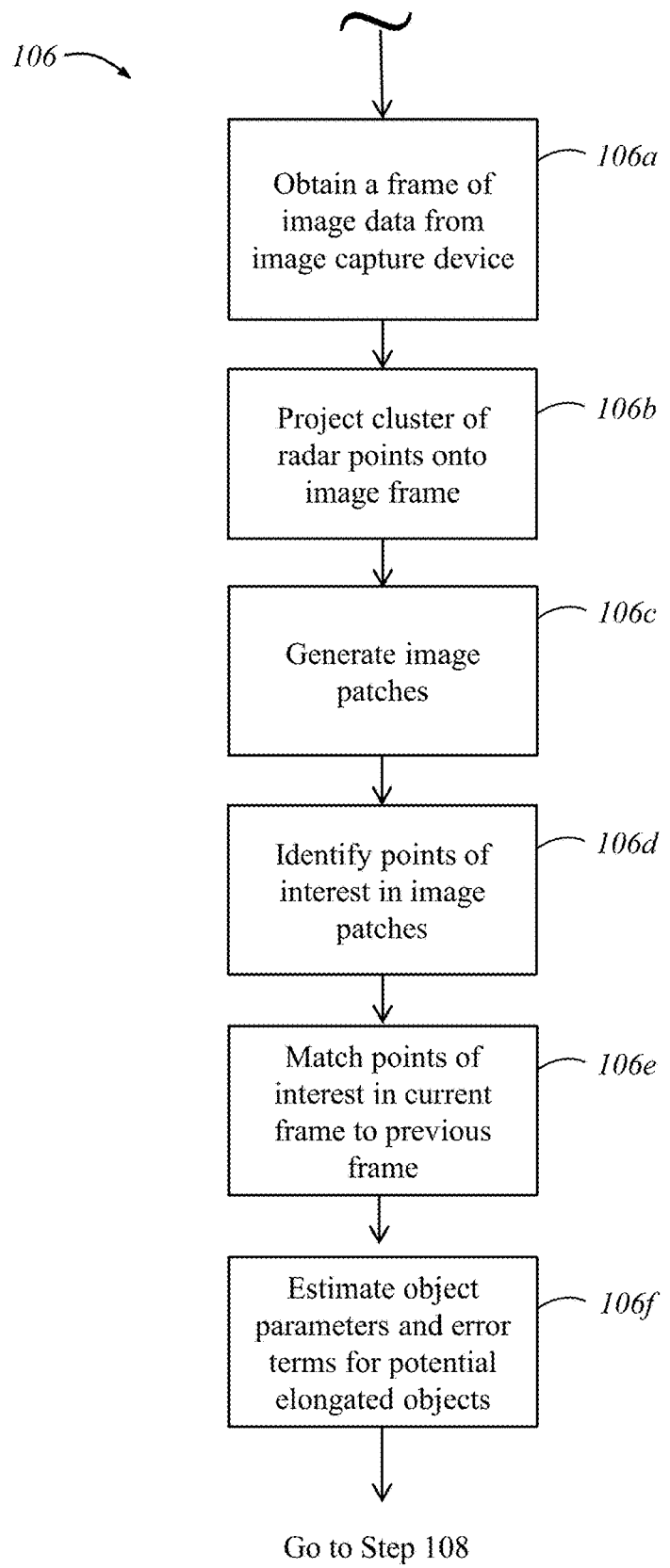
FIG. 6 illustrates a flow chart depicting an exemplary method for detecting a long object with an imaging device according to an embodiment of the present disclosure.

Referring again to FIG. 3, at step 108 the fusion module 20 receives and fuses the object parameter estimations for the potential elongated objects calculated in steps 104e and 106f according to the methods described with reference to FIGS. 4 and 6. The object parameter estimations are used to estimate the overall object parameters and to classify the detected elongated object(s). For example, at step 110 the fusion module 20 calculates parameter estimations such as location, speed, heading, etc. for the detected elongated objects by weighting the parameters computed from the radar detection device 16 and the imaging system 18 according to the following equation:

$$\theta = \alpha \theta_{radar} + \beta \theta_{vision}$$

where $\theta$ is the object parameter being calculated (i.e., location, speed, direction, size), $\theta_{radar}$ is the corresponding object parameter estimation from the radar detection device 16, $\theta_{vision}$ is the corresponding object parameter estimation from the imaging system 18, $\alpha$ is the weighting coefficient for the radar detection device 16, and $\beta$ is the weighting coefficient for the imaging system 18, wherein $\alpha+\beta=1$. The value of $\alpha$ and $\beta$ can be either predefined manually or learned based on the error terms $\in_{radar}$, $\in_{vision}$ which have been computed with the radar and vision-based parameter estimations of the elongated object. In one embodiment, the learning can be accomplished by:

$$(\alpha,\beta) = f(\in_{radar}, \in_{vision})$$

where the function $f$ is any kind of learning function as known to those skilled in the art, $\in_{radar}$ represents the error related to the radar detection data, and $\in_{vision}$ represents the error related to the imaging detection data.

At step 112, the detected elongated object is classified by object type. This is to determine the type of elongated object, for example, a guardrail, a wall, a long truck, etc. In one embodiment, the elongated object is classified by determining a maximum probability for a particular class of object given a combination of detection data, which in this example, is a combination of radar detection data and imaging detection data. An exemplary function used to classify the elongated objects is given by:

$$\operatorname*{argmax}_{N} Prob(\text{class} = N \mid I, G)$$

which represents the highest probability of a particular class for an observed image patch I and the clustered group G of radar signals having N candidate classes (e.g. guardrails, walls, trucks, curbs, etc.) for an object.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

While the above-description includes a general context of computer-executable instructions, the present disclosure can also be implemented in combination with other program modules and/or as a combination of hardware and software. The terms "algorithm," "method," "application," or variants thereof, are used expansively herein to include routines, program modules, programs, components, data structures, algorithms, and the like. Applications can be implemented on various system configurations, including single-processor or multiprocessor systems, microprocessor-based electronics, combinations thereof, and the like.

What is claimed is:

1. A method for detecting and identifying elongated objects relative to a host vehicle, the method comprising the steps of:
   detecting objects relative to the host vehicle using a plurality of object detection devices, wherein the plurality of object detection devices include at least one of the following: a radar detection device, a lidar detection device, or an imaging system;
   identifying patterns in detection data that correspond to an elongated object, wherein the detection data includes data fused from at least two of the plurality of object detection devices;
   determining initial object parameter estimates for the elongated object using each of the plurality of object detection devices;
   calculating object parameter estimates for the elongated object by fusing the initial object parameter estimates from each of the plurality of object detection devices; and
   determining an object type classification for the elongated object by fusing the initial object parameter estimates from each of the plurality of object detection devices.

2. The method of claim 1, wherein the plurality of object detection devices includes both the radar detection device and the imaging system.

3. The method of claim 2, wherein the step of identifying patterns includes identifying radar signal patterns in radar detection data generated by radar sensors.

4. The method of claim 3, wherein the step of identifying the radar signal patterns includes clustering an initial set of radar measurements into at least one group according to one or more metric(s).

5. The method of claim 4, wherein the one or metrics includes a location and signal strength for each radar measurement in the radar detection data.

6. The method of claim 5, wherein the one or more metric(s) further include a metric derived from captured image data from the imaging system.

7. The method of claim 6, wherein the clustering step further includes mapping radar detection data to the captured image data to determine corresponding image pixel data.

8. The method of claim 4, wherein identifying patterns in the detection data further includes determining, for each of the at least one group, a distribution of the radar measurements in a first dimension, and a concentration of radar measurement locations along a second dimension, which is perpendicular to the first dimension.

9. The method of claim 4, wherein identifying patterns in the detection data further includes applying a linear regression model to the radar measurements in each of the at least one group that satisfy the one or more metric(s).

10. The method of claim 4, wherein identifying patterns in the detection data further includes sorting each radar measurement in each of the at least one group according to an azimuth angle measured relative to the host vehicle.

11. The method of claim 10, further including determining if a range rate associated with each of the sorted radar measurements changes gradually with respect to one another according to a range rate threshold.

12. The method of claim 11, further including estimating a relative speed for a group of radar measurements that have a gradual change in range rate according to the range rate threshold, wherein estimating the relative speed includes applying a linear regression speed model to the group of radar measurements.

13. The method of claim 2, wherein detection data generated by the imaging system includes one or more frame(s) of image data relating to captured images, and wherein the step of identifying patterns includes identifying regions of interest in each frame and tracking points of interest in each of the regions of interest from a previous frame to a current frame.

14. The method of claim 1, wherein calculating the object parameter estimates further includes determining a parameter weight for each of the initial object parameter estimates computed by each of the plurality of object detection devices, and summing weighted object parameters for each of the plurality of object detection devices.

15. The method of claim 1, wherein determining the object type classification for the elongated object includes determining a maximum probability of a particular class of objects as a function of the initial object parameter estimates from each of the plurality of object detection devices.

16. A method for detecting and identifying elongated objects relative to a host vehicle, the method comprising the steps of:
   obtaining detection data relating to objects detected using a plurality of object detection devices, wherein the plurality of object detection devices include at least one of the following: a radar detection device, a lidar detection device, or an imaging system;
   fusing the detection data at a first processing level by referencing complementary detection data from each of the plurality of object detection devices;
   classifying a detected object as an elongated object at each of the plurality of object detection devices by identifying patterns in the fused detection data that correspond to an elongated object;
   calculating initial object parameter estimates for the elongated object using each of the plurality of object detection devices;
   fusing the detection data at a second processing level by:
      weighting the initial object parameter estimates for each of the plurality of object detection devices and summing the weighted initial object parameter estimates to determine object parameter estimates for the elongated object, and
      calculating a maximum probability of a particular class of objects as a function of the initial object parameter estimates from each of the plurality of object detection devices to determine an object type classification for the elongated object.

17. The method of claim 16, wherein the detection data includes radar measurements from the radar detection device and captured image data from the imaging system, and wherein classifying the detected object as an elongated object includes using the radar detection device to apply position and velocity linear regression models to groups of radar measurements clustered according to a location, a signal strength, or both, of the radar measurements and corresponding image pixel data from the captured image data, and using the imaging system to identify regions of interest in each frame of image data and tracking points of interest in each of the regions of interest from a previous frame to a current frame.

18. A system for detecting and identifying elongated objects relative to a host vehicle, the system comprising:
   at least two object detection devices selected from the following: a radar detection device, a lidar detection device, or an imaging system, and wherein the at least two object detection devices are configured to:

obtain detection data relating to objects detected in a field-of-view relating to each of the at least two object detection devices;

fuse the detection data by referencing complementary detection data from each of the at least two object detection devices;

classify a detected object as an elongated object by identifying patterns in the fused detection data that correspond to an elongated object; and calculate initial object parameter estimates for the elongated object using each of the at least two object detection devices;

at least one vehicle control module configured to:

receive the initial object parameter estimates from each of the at least two object detection devices and fuse the detection data to determine object parameter estimates and to classify the type of elongated object.

19. The system claim 18, wherein the at least two object detection devices include the radar detection device and the imaging system, and wherein the at least one vehicle control module is a fusion module.

20. The system of claim 18, wherein the at least one vehicle control module is configured to fuse the detection data by:

weighting the initial object parameter estimates for each of the plurality of object detection devices and summing the weighted initial object parameter estimates to determine object parameter estimates for the elongated object, and calculating a maximum probability of a particular class of objects as a function of the initial object parameter estimates from each of the plurality of object detection devices to determine an object type classification for the elongated object.

\* \* \* \* \*